United States Patent

[11] 3,577,756

| | | | |
|---|---|---|---|
| [72] | Inventor | James E. Cramer Rte. 6, Box 118, Burlington Township, Racine County, Wis. 53105 | |
| [21] | Appl. No. | 830,374 | |
| [22] | Filed | June 4, 1969 | |
| [45] | Patented | May 4, 1971 | |

[54] TWO-PASS WELD BEAD FINISHING PROCESS FOR PIPE AND TUBING
4 Claims, 4 Drawing Figs.

[52] U.S. Cl. ................................................. 72/193, 72/209
[51] Int. Cl. ....................................................B21b 21/00, B21b 17/10
[50] Field of Search........................................... 72/209, 193, 199, 370, 208

[56] References Cited
UNITED STATES PATENTS

| 742,645 | 10/1903 | Heer | 72/193 |
|---|---|---|---|
| 988,569 | 4/1911 | Harkness | 72/209 |
| 1,162,772 | 12/1915 | Henderson | 72/209 |
| 2,712,249 | 7/1955 | Siegerist | 72/209X |

*Primary Examiner*—Milton S. Mehr
*Attorney*—James E. Nilles

ABSTRACT: This invention relates to apparatus for removing an internal weld bead from longitudinally welded metal tubing during longitudinal movement of the tubing. The apparatus has a plurality of spaced-apart plugs each positioned axially within the tubing and having a diameter portion in simultaneous contact with the weld bead and an opposite internal surface area of the tubing. Separate means are associated with each plug for sequentially applying a compressive force to the tubing over an external surface area thereof adjacent the plug to compress the tubing against the contacting diameter portions of the plug. During force application the plug moves axially a distance with the tubing. The plug is flexibly anchored which permits it to return to its original position upon release of the compressive force.

James E. Cramer

TWO-PASS WELD BEAD FINISHING PROCESS FOR PIPE AND TUBING

In the manufacture of welded tubing, it is conventional practice to form, by the use of roll-forming apparatus, skelp to a tubular configuration whereupon the skelp edges, which form an open seam, are joined by a continuous welding operation. In this operation, a weld bead is produced that extends longitudinally along the length of the tubing. This weld bead depends inwardly toward the pipe axis about 0.005 inch from the interior wall of the tubing. A portion of the weld bead is also present on the tube exterior. For the product to meet commercial standards, this weld bead must be removed or at least worked to the extent that the interior of the pipe presents a substantially smooth surface.

In view of the development of relatively high-speed welding equipment, which may be used to weld the seam while the tubing is traveling at a speed on the order of about 40 feet per minute, it is necessary that weld-bead finishing apparatus provide for weld bead removal at this high rate of tubing travel.

It is accordingly the primary object of the present invention to provide apparatus for removing weld bead from longitudinally welded tubing that may be adapted to perform this operation at high rates of tubing travel and further may be adapted to perform this function at a speed synchronous with the speed at which the tubing is being welded by the associated welding apparatus.

This and other objects of the invention as well as a complete description and understanding thereof may be obtained from the following description and drawings in which.

Broadly, the apparatus of the invention comprises a pair of spaced-apart, barrel-shaped plugs positioned axially within metal tubing, which has just been subject to a longitudinal welding operation. The plugs in spaced-apart relation are anchored by an extensible, flexible cable to an anchor. Adjacent each plug is a roll stand, each stand comprising an upper and lower workroll having identical working surfaces. The workrolls of each stand are driven synchronously. The surface of each of the rolls has a continuous circumferential groove with generally concave spaced-apart working surfaces that when in contact with the tubing compress the same against contacting diameter portions of the plugs and move the plugs a distance axially with the tubing. Upon release of the compressive force the extensible cable permits the plugs to return axially to their original position. The concave working surfaces of the rolls are interrupted by a plurality of chords of equal length evenly spaced about the groove circumference. When the chord portion of the roll is adjacent the tubing, the compressive force is released from the tubing and associated plug. During compressive force application the weld bead is worked to a smooth surface finish substantially conforming to the interior and exterior tubing surfaces. By having each of the working surfaces of the rolls of greater length than that of each of the chords, the longitudinal area of the tubing contacted by the working surfaces of the second stand will overlap that of the first stand, with the actual spacing between the two stands being equal to:

$$\text{Spacing between Stands} = \frac{(\text{``}N\text{''} + \frac{1}{2}) \times \pi \times \text{throat diameter}}{\text{number of working surfaces in finishing rolls}}$$

(Note: N can be any integer and will thereby vary the spacing between the finishing passes as required.)

Two or more roll stands can be used depending primarily upon the speed at which the tubing is moving incident to the forming and welding operations. Each roll stand finishes a longitudinal portion of the weld bead with the portion being finished at each stand decreasing with increased speed of tubing movement. If more than two roll stands are used the working surfaces of the rolls would become less, not greater, than the chords. In addition the equation for spacing the stands would be modified.

Figure 2:
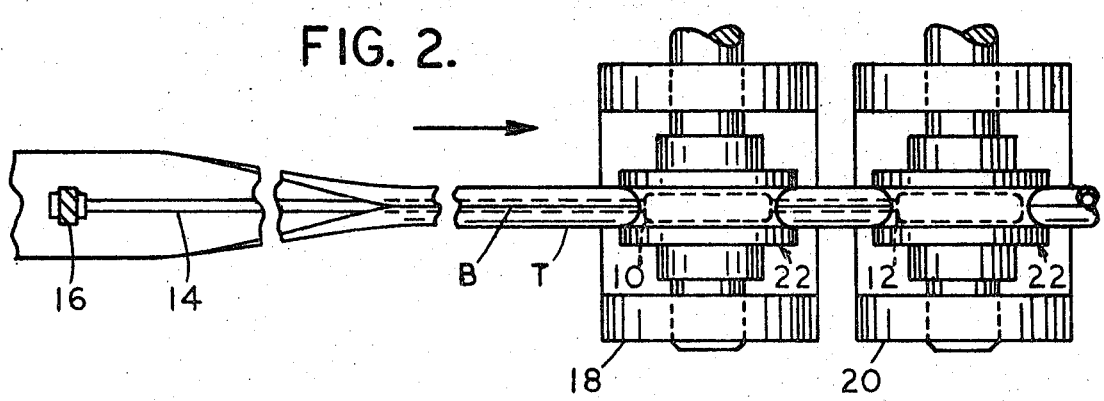
FIG. 2 is a plan view of the apparatus of FIG. 1.
Figure 1:
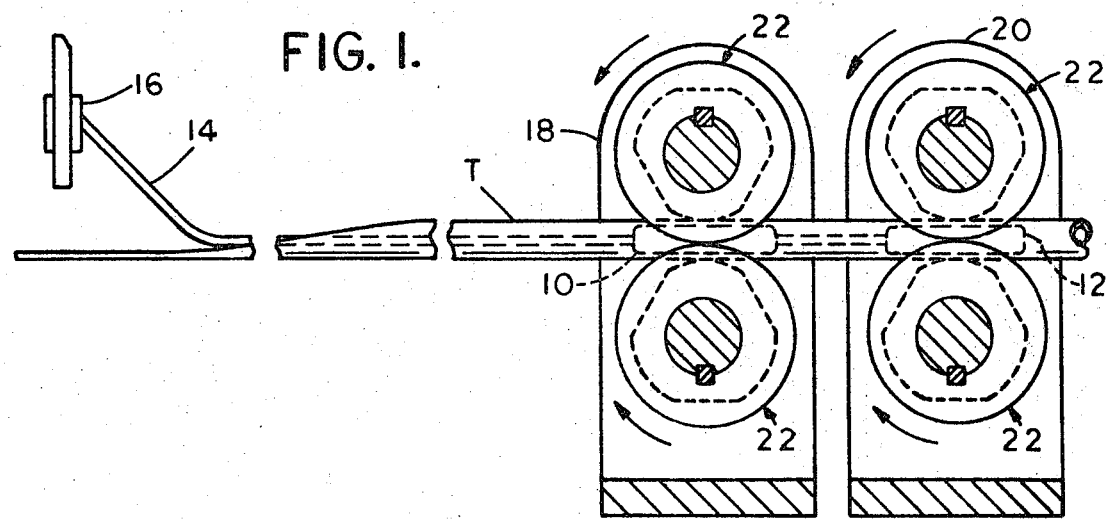
FIG. 1 is a side elevation of apparatus in accordance with the invention.

With reference to the drawings, and for the present to FIGS. 1 and 2 thereof, there is shown in accordance with the present invention apparatus for processing longitudinally welded tubing, designated by the letter T, moving in the direction of the arrow. The tubing has been roll-formed and welded longitudinally by conventional apparatus (not shown), and this welding operation has resulted in the characteristic longitudinal weld bead indicated generally as B. Within the tubing is positioned a pair of spaced-apart, barrel-shaped plugs 10 and 12 that are connected by an extensible cable 14 to an upright 16. Adjacent each plug is a roll stand 18 and 20. Each stand is provided with identical upper and lower rolls; the rolls of each stand are identical and are indicated by the number 22 in the drawings. The rolls of each stand are driven by conventional means (not shown). Each roll is synchronized so that the identical angular portion of each is in simultaneous contact with the tubing surfaces. To adjust for various tubing diameters and to obtain the correct weld bead finishing pressure conventional, adjustable screw-downs (not shown) are provided for varying the horizontal position of the upper workrolls of each stand. Preferably, the means for driving the rolls are synchronized with the roll-forming and welding operations so that the speed of roll rotation varies with the speed of these prior operations to permit continuous, in-line operation.

Figure 3:
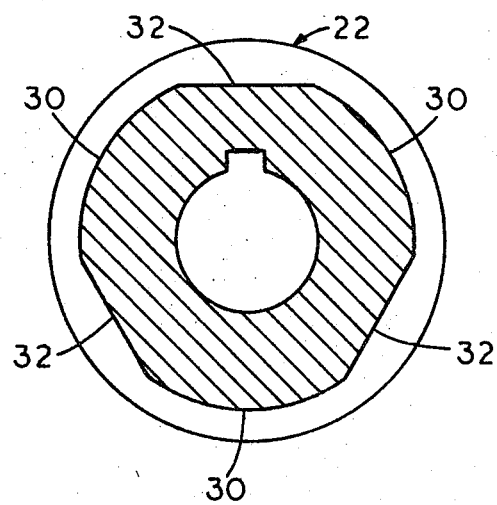
FIG. 3 is an enlarged transverse sectional view of a portion of the apparatus of FIGS. 1 and 2, namely the workrolls.
Figure 4:
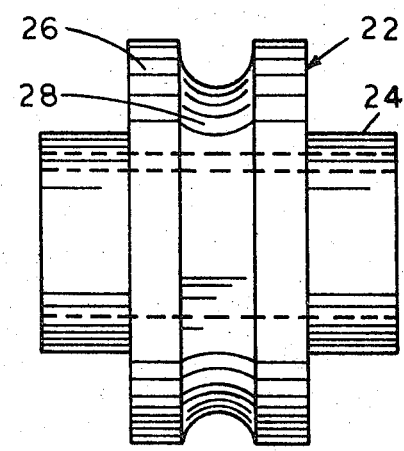
FIG. 4 is an end view of the roll of FIG. 3.

As best shown in FIGS. 3 and 4, each roll 22 has a hub 24 and a roll body 26. The edge of the roll body 26 is provided with a centered, continuous circumferential groove 28. The groove 28 has a plurality of spaced-apart generally concave working surfaces 30 separated by chords 32, each of which are of equal length. As discussed hereinabove, the length of each working surface 30 is greater than that of each chord 32.

In the operation of the apparatus, with tubing T moving in the direction of the arrows as shown in FIGS. 1 and 2 and with the rolls 22 of stands 18 and 20 being driven, also in the direction of the arrows, as the working surfaces of these rolls come into contact with the tubing surface they serve to compress it against the plugs 10 and 12. During this operation the plugs are moved with the tubing a distance, during which time the compressive force works the weld bead to a smooth surface. When the rolls rotate to an angular position such that the chords 32 are adjacent the tubing, the compressive force is released and the extensible cable 14 returns the plugs 10 and 12 to their original position. Upon further rotation of the rolls 22 a working surface 30 will again contact the tubing and compress the weld bead thereof against the plugs to repeat the sequence just described. By this operation continuous, in-line working and substantial removal of the weld bead is achieved. By proper selection of the number of roll stands and the spacing between the stands, in the manner described hereinabove, the operation may be compatible with any particular forming and welding operation.

Although various embodiments of the invention have been shown and described herein it is obvious that other adaptations and modifications may be made by those skilled in the art without departing from the scope and spirit of the appended claims.

I claim:

1. Apparatus for removing an internal weld bead from longitudinally welded metal tubing during longitudinal movement thereof comprising a plurality of spaced-apart plugs each positioned axially within said tubing and having a diameter portion thereof in simultaneous contact with said weld bead and an opposite internal surface area of said tubing, separate means associated with each plug for sequentially applying a compressive force to said tubing over an external surface area adjacent said plug to compress said tubing against said contacting diameter portion of said plug to move said plug axially with said tubing, said means for applying said compressive force to said tubing comprising a pair of driven, opposed rolls forming a roll bite adjacent said associated plug, each roll having a circumferential groove with generally concave working surfaces interrupted by a plurality of chords of equal length evenly spaced about the groove circumference, and means for returning each plug axially to its original position upon release of said compressive force.

2. The apparatus of claim 1 wherein each pair of opposed rolls is synchronized in said sequential force application to said tubing movement.

3. The apparatus of claim 1 wherein each of said working surfaces is of greater length than that of each of said chords.

4. The apparatus of claim 1 wherein said means for returning said plugs is an extensible cable connecting said plugs to an anchor.